(12) United States Patent
Leutheuser et al.

(10) Patent No.: US 8,529,125 B2
(45) Date of Patent: Sep. 10, 2013

(54) DYNAMIC ESTIMATION OF CELL CORE TEMPERATURE BY SIMPLE EXTERNAL MEASUREMENTS

(75) Inventors: Andrew H. Leutheuser, Sunnyvale, CA (US); Wei Liu, Warren, MI (US); Mark E. Franchett, Grosse Pointe Park, MI (US); Mahendra M. Kenkre, Troy, MI (US); Paul J. Dudley, Fostoria, MI (US); Jason J. Nolte, Howell, MI (US); Charles Hua, Ann Arbor, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 233 days.

(21) Appl. No.: 13/112,541

(22) Filed: May 20, 2011

(65) Prior Publication Data

US 2011/0299564 A1    Dec. 8, 2011

Related U.S. Application Data

(60) Provisional application No. 61/348,286, filed on May 26, 2010.

(51) Int. Cl.
*G01K 1/00*     (2006.01)
*G01K 7/00*     (2006.01)

(52) U.S. Cl.
USPC ............................ 374/141; 374/183; 374/163

(58) Field of Classification Search
USPC .......................................... 374/141, 183, 163
See application file for complete search history.

(56) References Cited

U.S. PATENT DOCUMENTS

| | | | | |
|---|---|---|---|---|
| 5,862,515 | A * | 1/1999 | Kobayashi et al. | 702/63 |
| 6,076,964 | A | 6/2000 | Wu et al. | |
| 6,137,269 | A * | 10/2000 | Champlin | 320/150 |
| 7,059,769 | B1 * | 6/2006 | Potega | 374/185 |
| 7,155,075 | B2 * | 12/2006 | Rajendran et al. | 385/12 |
| 7,324,902 | B2 | 1/2008 | Verbrugge et al. | |
| 7,456,605 | B2 * | 11/2008 | Nakasho et al. | 320/107 |
| 7,660,694 | B2 | 2/2010 | Wu et al. | |
| 2002/0011822 | A1 | 1/2002 | Sakai et al. | |
| 2005/0231169 | A1 * | 10/2005 | Seo et al. | 320/150 |
| 2005/0275383 | A1 * | 12/2005 | Ishishita | 320/150 |
| 2007/0072060 | A1 * | 3/2007 | Chang et al. | 429/62 |
| 2007/0139017 | A1 | 6/2007 | Marchand et al. | |
| 2010/0309949 | A1 * | 12/2010 | Akaboshi et al. | 374/45 |
| 2012/0099618 | A1 * | 4/2012 | Nishi et al. | 374/152 |
| 2012/0109554 | A1 * | 5/2012 | Lin et al. | 702/63 |
| 2012/0128026 | A1 * | 5/2012 | Kenkre et al. | 374/134 |

* cited by examiner

*Primary Examiner* — Mirellys Jagan
(74) *Attorney, Agent, or Firm* — Dinsmore & Shohl LLP (57) ABSTRACT

Methods and systems for dynamically estimating the core temperature of at least one cell in a battery during an operative period. The method includes receiving by at least one controller the surface temperature, the current, the voltage, the state of charge, and the period of time from the initiation of a rest period to the termination of the rest period, determining an initial value of the lumped internal resistance of the at least one cell, determining subsequent values of the lumped internal resistance recursively in real-time based on the initial value, the current, and the voltage, and determining the core temperature of the at least one cell based on the surface temperature, the current, the obtained time, and the lumped internal resistance. The system for dynamically estimating the core temperature of the cells in a battery includes a plurality of sensors configured to transmit signals related to surface temperature, current, and voltage of the battery, a timing device configured to transmit signals related to the period of time from the initiation of a rest period to the termination of the rest period, and a control system, wherein the control system comprises a memory device and a controller.

20 Claims, 6 Drawing Sheets

DYNAMIC ESTIMATION OF CELL CORE TEMPERATURE BY SIMPLE EXTERNAL MEASUREMENTS

This application claims priority to U.S. Provisional Application Ser. No. 61/348,286, filed May 26, 2010.

TECHNICAL FIELD

The present disclosure relates to methods and systems for estimating the core temperature of at least one cell in a battery. More specifically, the present disclosure relates to methods and systems for dynamically estimating the core temperature of at least one cell in a battery during an operative period by simple external measurements.

BACKGROUND

The increasing demand to improve vehicular fuel economy and reduce vehicular emissions has led to the development of both hybrid vehicles and pure electric vehicles. Pure electric vehicles may be powered by a battery pack (which is made up of numerous smaller modules or cells), while hybrid vehicles include two or more energy sources, such as a gasoline (also referred to as an internal combustion) engine used as either a backup to or in cooperation with a battery pack. There are two broad versions of hybrid vehicles currently in use. In a first version (known as a charge-depleting hybrid architecture), the battery can be charged off a conventional electrical grid such as a 120 VAC or 240 VAC power line. In a second version (known as a charge-sustaining hybrid architecture), the battery receives all of its electrical charging from one or both of the internal combustion engine and regenerative braking. In either configuration, various parameters associated with the battery pack can be monitored to ensure proper operation.

The temperature of a cell in a battery (or battery pack) is a critical factor related to the life and performance of the battery. Thus, the accurate determination of the temperature of a cell is essential to the life and performance of a battery. While one method of determining the temperature of a cell in a battery is to put a sensor in contact with the core of the cell in a battery, this method is generally available only in a laboratory setting, as it is placed in a sealed area of the battery that would be inaccessible in a production environment. As a result, the temperature of a cell in a battery is currently determined by directly measuring the temperature of the surface of the cell with a sensor. However, the temperature of the surface of a cell in a battery is often different from the temperature of the core of a cell in a battery. For example, the difference in temperature between the surface temperature of a cell and the core temperature of a cell in a battery during an operative period may be as large as 10° C. A difference in temperature of 10° C. can significantly alter the life and performance of a battery. For instance, a battery can be operated for greater than twelve years if the battery functions at 25° C.; however, a battery may be operated for only seven years if the battery functions at 35° C. Additionally, a battery can provide about 14 kW of power at 0° C.; however, a battery can provide only about 8 kW of power at −10° C. As a result, the use of the surface temperature as a representation of the core temperature may introduce error into calculations involving the core temperature of a cell in a battery and may also have a significant impact on the life and performance of the battery.

SUMMARY

According to one embodiment, a method for dynamically estimating the core temperature of at least one cell in a battery during an operative period is disclosed. The method includes receiving by at least one controller the surface temperature, current, voltage, and state of charge of the at least one cell, and the period of time from the initiation of a rest period to the termination of the rest period, determining an initial value of the lumped internal resistance of the at least one cell, determining subsequent values of the lumped internal resistance recursively in real-time based on the initial value, the current, and the voltage, and determining the core temperature of the at least one cell based on the surface temperature, the current, the obtained time, and the lumped internal resistance.

Optionally, the core temperature is determined independent of at least one of cooling air temperature, cooling air flow rate, and fan speed of the battery. The subsequent values of the lumped internal resistance may be determined recursively in real-time via a least squares relationship. The initial value may be determined at the termination of the rest period based on the surface temperature and the state of charge.

Optionally, the method includes limiting the surface temperature to a predetermined value range. The method may also include filtering at least one of the surface temperature, the current, and the voltage via a low-pass filter method. The method may also include filtering the surface temperature via a moving average method.

Optionally, the method includes filtering the estimated internal resistance. Optionally, the method may also include updating the determined core temperature at a period time interval. The periodic time interval may be about 25 ms. The method may also include storing temperature information of the cell wherein one or more of the cells faults.

Optionally, the determined core temperature of the at least one cell is characterized by the following relationship:

$$T_{est}(k+1) = \frac{\tau - \Delta T}{\tau} T_{est}(k) + \frac{\Delta T}{\tau} T_{sur}(k) + \frac{\Delta T}{\tau} \alpha R_{int} I^2(k)$$

wherein $\tau$ is a thermal dynamic time constant, $\alpha$ is a heat transfer constant, $T_{est}$ is the estimated core temperature of the at least one cell, $T_{sur}$ is surface temperature of the at least one cell, $\Delta T$ is the time period from the previous estimation of the core temperature of the at least one cell to the current estimation of the core temperature of the at least one cell, $R_{int}$ is the internal resistance of the at least one cell, and I is the current of the at least one cell.

In yet another embodiment, a system for dynamically estimating the core temperature of at least one cell in a battery in a vehicle during an operative period wherein the vehicle receives at least a portion of its power from the battery is disclosed. The system includes a plurality of sensors configured to transmit signals related to at least one of the surface temperature, the current, and the voltage of the battery, a timing device configured to transmit signals related to the period of time from the initiation of a rest period to the termination of the rest period, and a control system in signal communication with the plurality of sensors, wherein the control system comprises a memory device and a controller in signal communication with the memory device with instructions for dynamically estimating the core temperature of at least one cell in a battery during an operative period and subsequent to a rest period. The instructions are written to receive the surface temperature, current, voltage, and state of charge of the at least one cell and obtain the period of time from the initiation of the rest period to the termination of the rest period, to determine an initial value of the lumped internal resistance, to determine subsequent values of the lumped internal resistance recursively in real-time based on the initial value, the current, and the voltage, and to determine the core temperature of the at least one cell based on the surface temperature, the current, the obtained time, and the lumped internal resistance.

Optionally, the core temperature is determined independent of at least one cooling air temperature, cooling air flow rate, and fan speed of the battery. The initial value may be determined at the termination of the rest period based on the surface temperature and the state of charge. The instructions may be further written to limit at least one of the surface temperature and the estimated lumped internal resistance. The instructions may also be further written to filter the surface temperature.

Optionally, the instructions are written to update the determined core temperature at a periodic time interval. The instructions may also be written to store temperature information of the at least one cell wherein one or more of the at least one cell faults. Also, a vehicle may incorporate the system for dynamically estimating the core temperature.

These and other features and advantages of these and other various embodiments according to the present disclosure will become more apparent in view of the drawings, detailed description, and claims provided that follow hereafter.

BRIEF DESCRIPTION OF THE DRAWINGS

The embodiments set forth in the drawings are illustrative and exemplary in nature and not intended to limit the subject matter defined by the claims. The following detailed description of the embodiments of the present disclosure can be best understood when read in conjunction with the following drawings, where like structure is indicated with like reference numerals, and in which:

DETAILED DESCRIPTION

The following terms are used in the present application:

The terms "dynamic" and "dynamically" are used herein to refer to the variable or changing estimation of the core temperature of at least one cell in a battery. For example, the core temperature of at least one cell in a battery is dynamically estimated such that the determined core temperature is updated in real-time without delay. In one embodiment, the determined core temperature is updated about every 25 ms.

The terms "about" and "substantially" are used herein to represent the inherent degree of uncertainty that may be attributed to any quantitative comparison, value, measurement, or other representation. The terms "about" and "substantially" are also used herein to represent the degree by which a quantitative representation may vary from a stated reference without resulting in a change in the basic function of the subject matter at issue.

The term "operative period" is used herein to refer to a period of time wherein the cells in a battery are charging or discharging. In the context of a vehicle, in one particular aspect, the operative period refers to a period of time wherein the vehicle is turned on such that the cells in the battery are charging or discharging.

The terms "charging", "charge" and "charged" are used herein to refer to a state wherein the controller initiates the conversion of electrical energy to chemical energy of the battery.

The terms "discharging", "discharge" and "discharged" are used herein to refer to a state wherein the controller initiates the conversion of chemical energy of the battery to electrical energy.

The term "rest period" is used herein to refer to a period of time wherein the cells in a battery are neither charging nor discharging. In the context of a vehicle, in one particular aspect, the rest period refers to a period of time wherein the vehicle is turned off such that the cells in the battery are neither charging nor discharging.

In the context of the rest period, the term "initiation" is used herein to refer to the time at which the rest period begins. In one particular aspect, initiation refers to the time at which the controller ceases to initiate charging or discharging the cells of the battery. In the context of a vehicle, initiation refers to the time at which the key is turned to the off position such that controller ceases to initiate charging or discharging the cells of the battery, or "key-off."

Similarly, in the context of the rest period, the term "termination" is used herein to refer to the time at which the rest period ends. In one particular aspect, termination refers to the time at which the controller initiates charging or discharging the cells of the battery. In the context of a vehicle, termination refers to the time at which the key is turned from the off position to a position wherein the controller initiates charging or discharging the cells of the battery, or "key-on." For example, the key may be turned from the off position to the on position or to any of the accessory positions.

Also in the context of the rest period, the term "subsequent to the termination of the rest period" is used herein to refer to the period of time following the termination of the rest period wherein the core temperature is dynamically estimated at periodic time intervals. In one specific aspect, the core temperature is dynamically estimated about every 25 ms.

The term "fault" is used herein to refer to an abnormal condition or defect relating to the battery which may lead to a failure. In one particular aspect, fault refers to an abnormal condition or defect which relates to the temperature, voltage, or current of the battery.

Figure 1:
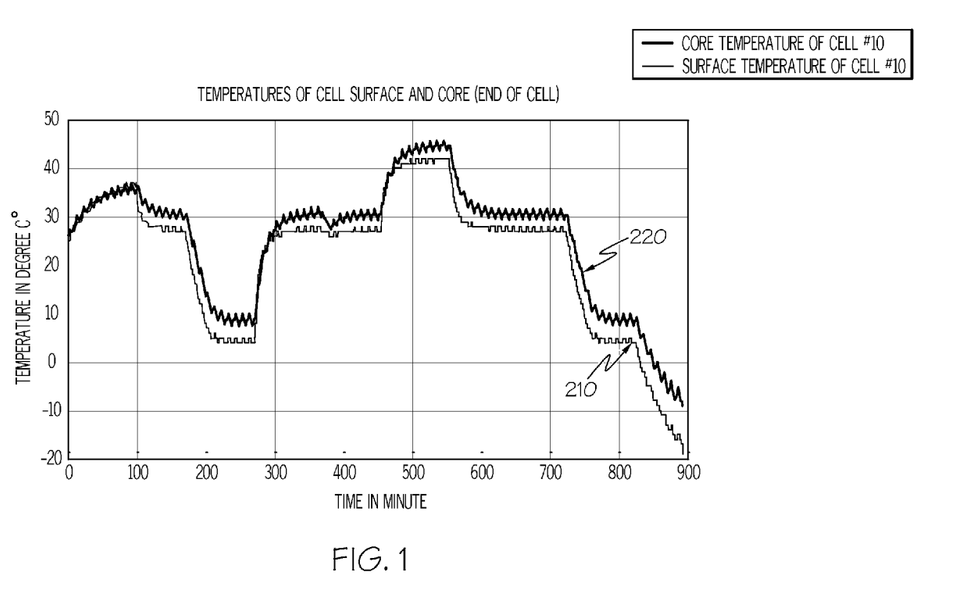
FIG. 1 is a graph of temperature versus time which depicts the relationship between the surface temperature of at least one cell in a battery and the core temperature of at least one cell in a battery.

Embodiments of the present disclosure relate to methods and systems for dynamically estimating the core temperature of at least one cell in a battery during an operative period. As discussed above, there is a difference between the surface temperature and the core temperature of cells in a battery (or battery pack). As shown in FIG. 1, the difference in temperature between the surface temperature 210 and the core temperature 220 of a cell in a battery during an operative period may be as large as 10° C.

Method for Dynamically Estimating the Core Temperature

Figure 3:
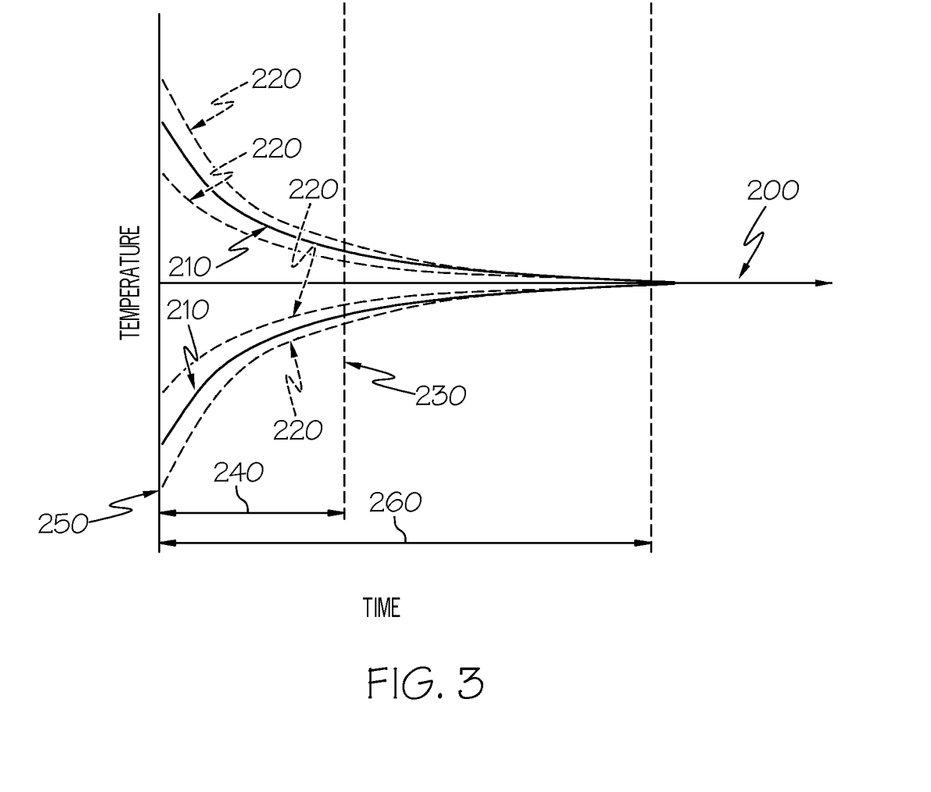
FIG. 3 is a graph of temperature versus time which depicts the relationship between the surface temperature of at least one cell in a battery and the core temperature of at least one cell in a battery during a rest period in accordance with at least one of the embodiments of the present disclosure.

A method for dynamically estimating the core temperature 220 of at least one cell in a battery (or battery pack) during an operative period is disclosed. The method includes receiving by at least one controller the surface temperature 210, current, voltage, and state of charge of the at least one cell, and the period of time from the initiation 250 of a rest period 240 to the termination 230 of the rest period 240, determining an initial value of the lumped internal resistance of the at least one cell, determining subsequent values of the lumped internal resistance recursively in real-time based on the initial value, the current, and the voltage, and determining the core temperature 220 of the at least one cell based on the surface temperature 210, the current, the obtained time, and the lumped internal resistance.

Specifically, the core temperature 220 of the cells is dynamically estimated in accordance with the following thermal dynamic model:

$$\tau \frac{dT_{est}(t)}{dt} + T_{est}(t) = T_{sur}(t) + R_{int}\alpha I^2(t) \quad (1)$$

wherein $\tau$ is a thermal dynamic time constant, $\alpha$ is a heat transfer constant, $T_{est}$ is the determined core temperature 220 (e.g. the determined core temperature 220), $T_{sur}$ is the surface temperature 210, $R_{int}$ is the internal resistance, and $I$ is the current. Upon discretization of Equation (1), the following equations are determined:

$$\tau \frac{T_{est}(k+1) - T_{est}(k)}{\Delta T} + T_{est}(k) = T_{sur}(k) + \alpha R_{int} I^2(k) \quad (2)$$

$$T_{est}(k+1) = \frac{\tau - \Delta T}{\tau} T_{est}(k) + \frac{\Delta T}{\tau} T_{sur}(k) + \frac{\Delta T}{\tau} \alpha R_{int} I^2(k) \quad (3)$$

wherein $\tau$, $T_{est}$, $T_{sur}$, $\alpha$, $R_{int}$, and $I$ are as described above, and wherein $\Delta T$ is the time period from the previous estimation of the core temperature 220 of the cells to the current estimation of the core temperature 220 of the cells. $\tau f(I_{cell}, T_{cell\_sur})$ and $\alpha f(I_{cell}, T_{cell\_sur})$ are a function of the current and surface temperature 210 of the cells and are set as calibratable lookup tables. The core temperature 220 of the cells is dynamically estimated based on the surface temperature 210 of the cells, the current 80 of the cells, the obtained period of time from the initiation of the rest period 240 to the termination 230 of the rest period 240, and the internal resistance.

Figure 2A:
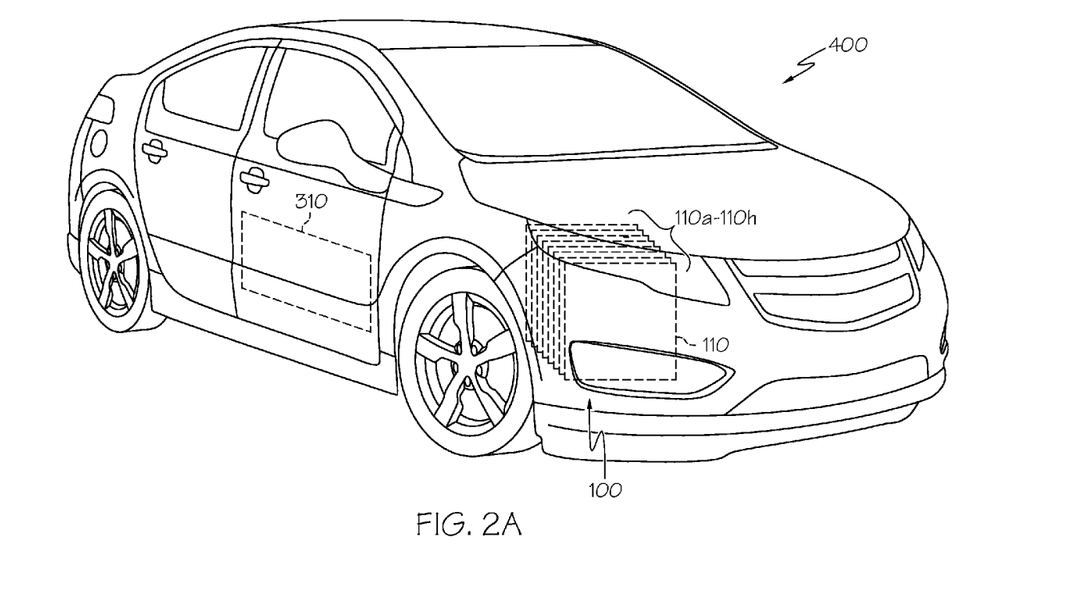
FIG. 2A depicts a vehicle employing a system for dynamically estimating the core temperature of at least one cell in a battery during an operative period in accordance with at least one embodiment of the present disclosure.
Figure 2B:
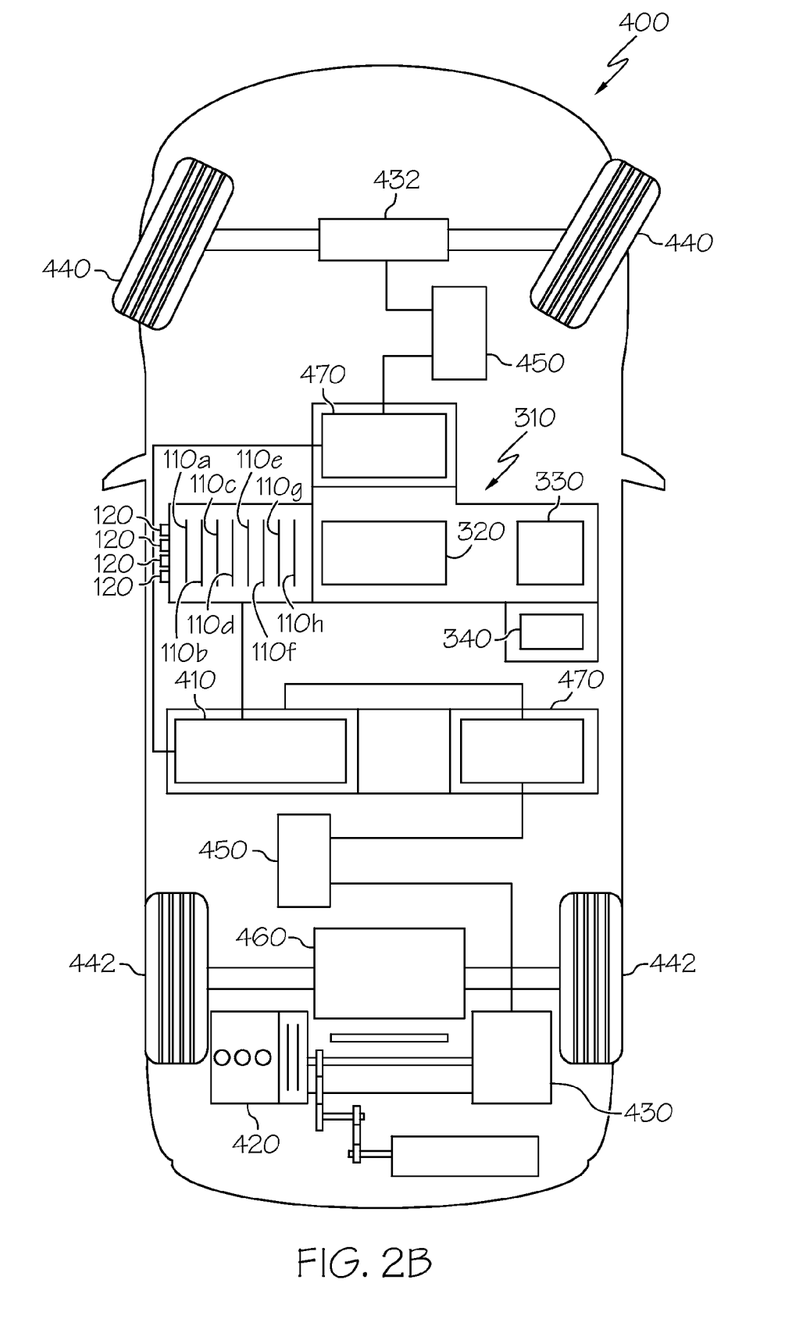
FIG. 2B depicts a vehicle platform with a diagrammatic representation of various components that provide motive power thereto, as well as the system for dynamically estimating the core temperature of at least one cell in a battery used to provide at least a portion of such motive power.

Referring to FIGS. 2A and 2B, the battery (or battery pack) 110 may be a portion of an energy storage system ("ESS") 100. The ESS 100 may be an air-cooled BAS+ESS. The ESS 100 may be utilized in a vehicle 400 that derives a portion of its motive power from the ESS 100, or may be applied to other vehicles and devices that will be appreciated by one of ordinary skill. It is understood by one of ordinary skill in the art that the method for dynamically estimating the core temperature 220 of the cells 110a-110h may be performed with batteries (or battery packs) 110 of any type, including but not limited to, lithium-ion batteries and lead-acid batteries. In a further aspect, the battery 110 includes at least one cell 110a-110h, wherein the cells 110a-110h include a surface and a core. It is further understood by one of ordinary skill in the art that the method for dynamically estimating the core temperature 220 may be performed with cells 110a-110h of any shape, size, and connectivity. For example, the shape of the cells 110a-110h may be substantially cylindrical and/or a substantially prismatic. Additionally, the connectivity of the cells 110a-110h may include parallel circuitry or series circuitry. In one particular aspect, the battery 110 includes thirty-two cells 110a-110h which are connected in series.

The surface temperatures 210 of the cells 110a-110h may be measured and/or determined in accordance with any methods known in the art. In one embodiment, the surface temperatures 210 of the cells 110a-110h are measured with at least one sensor 120. The sensors 120 may include any device capable of measuring the surface temperature 210 of cells 110a-110h in the battery 110. In one particular example, the sensor 120 is a thermistor. In another example, the battery 110 includes thirty-two cells 110a-110h connected in series, wherein the surface temperatures 210 of the cells 110a-110h are measured with six sensors 120 attached to six of the cells 110a-110h of the battery 110.

The current of the cells 110a-110h may be measured and/or determined in accordance with any methods known in the art. In one embodiment, the current is measured with at least one sensor 120. The sensors 120 may include any device capable of measuring the terminal current of the cells 110a-110h in the battery 110. For example, the terminal current of the cells 110a-110h may be measured with ammeters, clamp meters, or galvanometers, and combinations thereof.

The voltage of the cells 110a-110h may be measured and/or determined in accordance with any methods known in the art. In one embodiment, the voltage may be measured with at least one sensor 120. The sensors 120 may include any device capable of measuring the voltage 60 of cells 110a-110h in the battery 110. For example, the voltage may be measured with voltmeters, potentiometers, or oscilloscopes, and combinations thereof.

The state of charge of the cells 110a-110h may be estimated and/or determined in accordance with any methods known in the art. For example, the state of charge may be determined via the voltage-based or current-based methods as described in commonly owned U.S. Pat. No. 7,324,902, the contents of which are hereby incorporated by reference. Upon measuring the surface temperature 210 and determining the state of charge of the cells 110a-110h, the internal resistance 50 of the cells 110a-110h may be determined via a 2D lookup table.

As shown in FIG. 3, the rest period 240 is defined by the period of time from the initiation 250 of the rest period 240 to the termination 230 of the rest period 240. The period of time from the initiation 250 of a rest period 240 to the termination 230 of the rest period 240 may be measured and/or determined in accordance with any methods known in the art. In one embodiment, the period of time from the initiation 250 to the termination 230 of the rest period 240 is measured with a timing device. The timing device may include any timing device capable of measuring increments of time from the initiation 250 of the rest period 240 to the termination 230 of the rest period 240. For example, the timing device may comprise an electronic timer which measures the time during "key-off."

The determination of the core temperature 220 of the cells may be additionally based a previously determined value of the determined core temperature 220 from a previous estimation. In one embodiment wherein the previously determined core temperature 220 was estimated subsequent to the termination 230 of the rest period 240, the determined core temperature 220 was estimated as discussed in earlier and later sections. In this particular embodiment, the previously determined core temperature 220 may be stored in a memory device, as discussed in a later section.

In another embodiment, the determination of the core temperature 220 of the cells may be additionally based on an initial value of the determined core temperature 220 estimated at the termination 230 of the rest period 240. In this particular embodiment, the determined core temperature 220 is estimated by a method which differs from that previously discussed for dynamically estimating the core temperature 220. The core temperature 220 of the cells 110a-110h at the termination 230 of the rest period 240 may be estimated in accordance with any methods known in the art. For example, the determined core temperature 220 at the termination 230 of the rest period 240 may be estimated as described in commonly-owned U.S. application Ser. No. 13/112,376, filed May 20, 2011, the contents of which are fully incorporated by reference herein.

Referring to FIG. 3, in one particular embodiment, the core temperature 220 at the termination 230 of the rest period 240 is determined based on the determined core temperature 220 of the cells 110a-110h at the initiation 250 of the rest period 240, the surface temperature 210 of the cells 110a-110h at the initiation 250 of the rest period 240, the period of time from the initiation 250 of the rest period 240 to the termination 230 of the rest period 240, the time required for the time 260 required for the surface temperature 210 of the cells 110a-110h at the initiation 250 of the rest period 240 and the determined core temperature 220 of the cells 110a-110h at the initiation 250 of the rest period 240 to converge, and the surface temperature 210 of the cells 110a-110h at the termination 230 of the rest period 240.

The core temperature 220 is determined independent of at least one of cooling air temperature, cooling air flow rate, and fan speed of the battery.

Filtering and Limiting

The method may further include filtering the surface temperature 210, the current, and/or the voltage. In one embodiment, the surface temperature 210 may be filtered by a moving average method. For example, the current value of the surface temperature 210 may be averaged with previous values of the surface temperature 210. In one specific example, the current value of the surface temperature 210 may be averaged with the previous four values of the surface temperature 210. Then, the average value may be utilized as the surface temperature 210. At the termination of the rest period, the first surface temperature 210 is utilized as the surface temperature 210. Similarly, in situations where there are less than four previous values of the surface temperature, the surface temperature 210 is averaged with the previous values which are available. In this embodiment, the method may further include storing previously estimated values of the surface temperature 210.

The surface temperature 210, the current 80, and/or the voltage 60 may also be filtered via a low-pass filter. For example, the signals and/or information related to the surface temperature 210, the current 80, and/or the voltage 60 which exceed a cutoff frequency are attenuated. In one particular embodiment, the cutoff frequency is about 200 Hz. This may increase the robustness of the method for dynamically estimating the core temperature 220 of the at least one cell 110a-110h by preventing spikes in the current values of the surface temperature 210, the current 80, and/or the voltage 60 from the previous values.

The method may further include limiting the surface temperature 210 to a predetermined value range. For example, the predetermined value range may include theoretical minimum and maximum values for which the surface temperature 210 should neither fall below nor exceed. Specifically, the surface temperature 210 may be limited to fall within a range of from about −40° C. to about +85° C. For example, if the surface temperature 210 is below the minimum value (e.g. −40° C.), then the minimum value may be used as the value of the surface temperature 210. Similarly, if the surface temperature 210 is above the maximum value (e.g. +85° C.), then the maximum value may be used as the value of the surface temperature. This may increase the robustness of the method for dynamically estimating the core temperature 220 of the at least one cell 110a-110h by preventing values of the surface temperature 210 which are theoretically improbable.

Estimating the Internal Resistance

Figure 4:
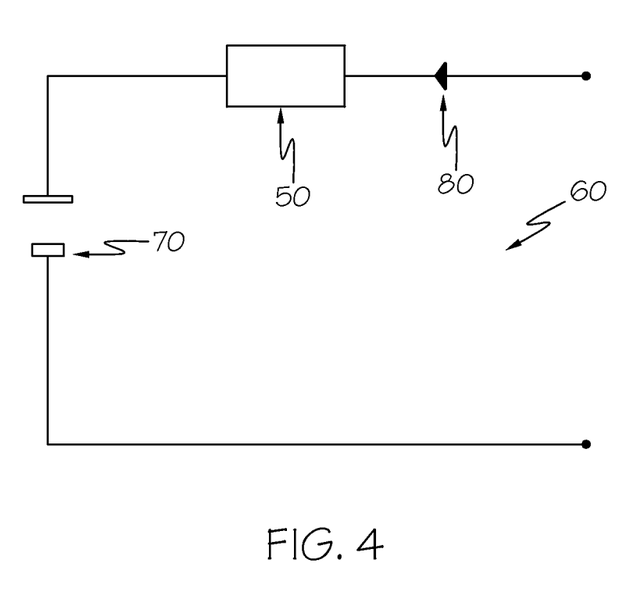
FIG. 4 is a schematic illustration of a two parameter battery electrical circuit equivalent model.

The method also includes determining an initial value of the lumped internal resistance 50 of the at least one cell 110a-110h and determining subsequent values of the lumped internal resistance 50 recursively in real-time based on the initial value, the current 80, and the voltage 60. The lumped internal resistance 50 is determined as an approximation of the internal resistance 50 of the cells 110a-110h. As shown in FIG. 4, the internal resistance 50 is one parameter in the two-parameter battery circuit equivalent model. The internal resistance 50 of the cells 110a-110h is the main heat source of the core temperature 220 of the cells 110a-110h and increases with age. The initial value of the lumped internal resistance is determined at the termination of the rest period 240 based on the surface temperature 210 of the cells 110a-110h and the state of charge of the cells 110a-110h. The surface temperature 210 and the state of charge of the cells 110a-110h may be measured, determined, and/or estimated as discussed in the previous section. The initial value of the lumped internal resistance is determined based on the surface temperature 210 and the state of charge of the cells 110a-110h via a 2D lookup table.

Subsequent values of the lumped internal resistance are determined recursively in real-time based on the initial value, the current, and the voltage. In one embodiment, subsequent values of the lumped internal resistance are determined recursively in real-time via a least squares relationship. More specifically, subsequent values of the lumped internal resistance are determined recursively in real-time based on the initial value of the lumped internal resistance, the current, and the voltage in accordance with the two-parameter battery circuit equivalent model, which is characterized by the following relationship:

$$V_{terminal}(k) = V_{oc}(k) + R_{int} I_{terminal}(k) \qquad (4)$$

wherein $V_{terminal}$ is the terminal voltage 60 of the cells 110a-110h, $V_{oc}$ is the open circuit voltage 70 of the cells 110a-110h, $R_{int}$ is the internal resistance 50 of the cells 110a-110h, and $I_{terminal}$ is the terminal current 80 of the cells 110a-110h.

In one embodiment, the lumped internal resistance 50 is recursively estimated by determining the lumped impedance. The lumped impedance is dependent upon the internal resistance 50 of the cells 110a-110h and the capacitance of the cells 110a-110h. The lumped impedance may be determined in real-time in accordance with a plurality of functional relationships based on the two-parameter battery electrical circuit equivalent model. The plurality of functional relationships is reduced into a set of time segmented recursive functional relationships. For example, the lumped impedance may be determined in accordance with the following relationships:

$$\begin{bmatrix} R_{int}(k+1) \\ V_{oc}(k+1) \end{bmatrix} = \begin{bmatrix} R_{int}(k) \\ V_{oc}(k) \end{bmatrix} + \begin{bmatrix} K_1(k+1)(V_t(k+1) - R_{int}(k) \cdot I_t(k+1) - V_{oc}(k)) \\ K_2(k+1)(V_t(k+1) - R_{int}(k) \cdot I_t(k+1) - V_{oc}(k)) \end{bmatrix} \quad (5)$$

$$\begin{bmatrix} K_1(k+1) \\ K_2(k+1) \end{bmatrix} = \frac{\begin{bmatrix} p_{11}(k) & p_{12}(k) \\ p_{21}(k) & p_{22}(k) \end{bmatrix}\begin{bmatrix} I_t(k+1) \\ 1 \end{bmatrix}}{\lambda + [I_t(k+1) \ 1]\begin{bmatrix} p_{11}(k) & p_{12}(k) \\ p_{21}(k) & p_{22}(k) \end{bmatrix}\begin{bmatrix} I_t(k+1) \\ 1 \end{bmatrix}} \quad (6)$$

$$\begin{bmatrix} p_{11}(k+1) & p_{12}(k+1) \\ p_{21}(k+1) & p_{22}(k+1) \end{bmatrix} = \quad (7)$$

$$\frac{1}{\lambda^2}\begin{bmatrix} 1 - K_1(k+1)I_t(k+1) & -K_1(k+1) \\ -K_2(k+1)I_t(k+1) & 1 - K_2(k+1) \end{bmatrix}\begin{bmatrix} p_{11}(k) & p_{12}(k) \\ p_{21}(k) & p_{22}(k) \end{bmatrix}$$

The recursive method is derived from the following order to estimate the internal resistance 50 of the cells 110a-110h:

$$R_{int}(k), V_{oc}(k), P(k) \xrightarrow{V_t(k+1), I_t(k+1)} K(k+1), \quad (8)$$

$$P(k+1) \xrightarrow{R_{int}(k), V_{oc}(k)} R_{int}(k+1), V_{oc}(k+1)$$

wherein $R_{int}$ and $V_{oc}$ are as described above.

As described in equations (5)-(8), the plurality of functional relationships are time-segmented in that the lumped internal resistance at one time can be modeled by a functional presentation of the lumped internal resistance at a previous time. For example, the lumped internal resistance can be recursively estimated based on previously determined values of the internal resistance and the open circuit voltage 70.

Limiting the Internal Resistance

The method for dynamically estimating the core temperature 220 may further include limiting the internal resistance 50 to a predetermined value range. Because the internal resistance 50 is an electrochemical parameter of a cell, the internal resistance 50 has a theoretical design value range based upon the state of charge and temperature. The internal resistance 50 is limited to a range within the theoretical design value range. The internal resistance 50 is limited to a predetermined value range by setting value limits such that if the internal resistance 50 is beyond the value limits, it will be saturated to the limit value. The internal resistance 50 is limited to a predetermined value range which falls in between the internal resistance 50 for a given state of charge and temperature at the beginning of the life of the cells 110a-110h and the internal resistance 50 for the same state of charge and temperature at the end of the life of the cells 110a-110h.

An upper value limit and a lower value limit may be set, such that the internal resistance 50 is limited to a predetermined value range which is less than or equal to the upper value limit and is greater than or equal to the lower value limit. This function is implemented in accordance with the following relationships:

$$R_{int}(t) = \begin{cases} R_{int\_upper\_lim} & \text{if } \hat{R}_{int}(t) > R_{int\_upper\_lim} \\ & \text{at given } SOC \text{ and temperature} \\ \hat{R}_{int}(t) & \text{if } R_{int\_lower\_lim} \leq \hat{R}_{int}(t) \leq R_{int\_upper\_lim} \\ & \text{at given } SOC \text{ and temperature} \\ R_{int\_lower\_lim} & \text{if } \hat{R}_{int}(t) < R_{int\_lower\_lim} \\ & \text{at given } SOC \text{ and temperature} \end{cases} \quad (9)$$

wherein $R_{int}$ is the internal resistance 50 as described above, $R_{int\_upper\_lim}$ is the upper value limit, and $R_{int\_lower\_lim}$ is the lower value limit. In one example, limiting the internal resistance 50 to a predetermined value range may increase the robustness of the method for dynamically estimating the core temperature 220 of the cells 110a-110h.

The internal resistance 50 does not dramatically change under normal operating conditions. The rate at which the internal resistance 50 changes is described in accordance with the following relationships:

$$\frac{dR_{int}(t)}{dt} = \begin{cases} R'_{int\_upper\_lim} & \text{if } \hat{R}'_{int}(t) > R'_{int\_upper\_lim} \\ & \text{at given } SOC \text{ and temperature} \\ \frac{d\hat{R}_{int}(t)}{dt} & \text{if } R'_{int\_lower\_lim} \leq \frac{d\hat{R}_{int}(t)}{dt} \leq R'_{int\_upper\_lim} \\ & \text{at given } SOC \text{ and temperature} \\ R'_{int\_lower\_lim} & \text{if } \hat{R}'_{int}(t) < R_{int\_lower\_lim} \\ & \text{at given } SOC \text{ and temperature} \end{cases} \quad (10)$$

wherein $dR_{int}(t)/dt$ is the rate at which the internal resistance 50 changes, $R'_{int\_upper\_lim}$ is the upper value limit, and $R'_{int\_Lower\_lim}$ is the lower value limit.

Updating the Determined Core Temperature 220

The method for dynamically estimating the core temperature 220 may further include updating the determined core temperature 220 of the cells 110a-110h at periodic time intervals. Updating the determined core temperature 220 includes replacing the previously determined core temperature 220 with the currently determined core temperature 220. The rate of estimation should not be higher than the rate of sampling and/or measuring the surface temperature 210. The rate of estimation and/or the periodic time intervals at which the determined core temperature 220 is updated is dependent upon the rate at which the surface temperature 210 of the cells 110a-110h changes. In one specific example, the estimation method includes updating the determined core temperature 220 of the cells 110a-110h about every 25 ms.

Storing Temperature Information

The method for dynamically estimating the core temperature 220 of at least one cell 110a-110h in a battery 110 during an operative period may further include storing temperature information at the initiation 250 of the rest period 240 wherein at least one cell 110a-110h faults. Various cell 110a-110h faults may occur during an operative period, including but not limited to, temperature faults, voltage 60 faults, and current 80 faults. In one example, temperature information may be stored wherein at least one cell 110a-110h experiences a temperature fault. In this example, the surface temperature 210 to be stored at the initiation 250 of the rest period 240 is as set forth in Table I below. Table I is provided as an example for a hybrid electric vehicle battery system wherein the core temperatures 220 of six cells 110a-110h are dynamically estimated in accordance with an embodiment of this disclosure.

TABLE I surface temperature 210 to Store at Initiation of the rest period 240

| | T Fault | surface temperature ($T_{sur}$) to Store |
|---|---|---|
| 0-5 cells faulted | 1 | 1) $T_{sur}$ of sister cell if not temperature-faulted or |
| | | 2) Average $T_{sur}$ of non-faulting cells or |
| | | 3) Average $T_{est}$ of non-faulting cells |
| | 0 | $T_{sur}$ |
| 6 cells faulted | 1 | Default Temperature (25° C.) |

As shown in Table I, in the situation wherein zero to five cells 110a-110h fault, the surface temperature 210 to store is selected from the group consisting of the surface temperature 210 of at least one non-faulting cell, the average surface temperature 210 of a plurality of non-faulting cells, and the average determined core temperature 220 of a plurality of non-faulting cells. Additionally, in the situation wherein zero cells 110a-110h fault, the surface temperature 210 to store at the initiation 250 of the rest period 240 is the surface temperature 210 of the non-faulting cell. Additionally, in the situation wherein all six cells 110a-110h experience a temperature fault, the surface temperature 210 to store at initiation of the rest period 240 or at key-off is a default temperature, or 25° C.

The method for dynamically estimating the core temperature 220 may further include storing temperature information wherein at least one cell 110a-110h experiences at least one of a voltage fault, a temperature fault, or a current fault. In this embodiment, the surface temperature 210 to be stored at the initiation 250 of the rest period 240 is as set forth in Table II below. Table II is provided as an example for a hybrid electric vehicle battery system wherein the core temperatures 220 for six cells 110a-110h are dynamically estimated in accordance with an embodiment of this disclosure.

TABLE II

Choices for Surface Temperature to Store at Initiation of the rest period 240

| | Voltage (V) Fault | Temperature (T) Fault | Current (I) Fault | Algorithm Execution | core temperature 220 ($T_{est}$) to Store |
|---|---|---|---|---|---|
| 0 cells faulted | 0 | 0 | 0 | Execute | $T_{est}$ |
| 1-5 cells faulted | 1 | 0 | 0 | Do Not Execute | Average $T_{est}$ of non-faulting cells |
| | 0 | 1 | 0 | | |
| 6 cells faulted | 1 | 0 | 0 | Do Not Execute | Default (25° C.) |
| | 0 | 1 | 0 | | Default (25° C.) |
| | x | x | 1 | | Default (25° C.) |

As shown in Table II, in the situation wherein zero cells 110a-110h experience a voltage fault, a temperature fault, or a current, fault, the surface temperature 210 to store at initiation 250 of the rest period 240 is the determined core temperature 220. Additionally, in this particular aspect, the method for dynamically estimating the core temperature 220 of at least one cell 110a-110h during an operative period is set to execute. In the situation wherein zero to five cells 110a-110h undergo a voltage fault or a temperature fault, the surface temperature 210 to store at initiation 250 of the rest period 240 is the average dynamically estimated core temperature 220 of a plurality of non-faulting cells 110a-110h or the dynamically estimated core temperature 220 of the non-faulting sister cell. Additionally, in this embodiment, the method for dynamically estimating the core temperature 220 of at least one cell 110a-110h during an operative period is not set to execute. Finally, in the situation wherein all six cells undergo a voltage fault, a temperature fault, or a current fault, the surface temperature 210 to store at initiation 250 of the rest period 240 is a default temperature, or 25° C. Additionally, in this embodiment, the method for dynamically estimating the core temperature 220 of at least one cell 110a-110h during an operative period is not set to execute.

It is understood by one of ordinary skill in the art that method for dynamically estimating the core temperature 220 of at least one cell 110a-110h may be envisioned as a multi-step process. Moreover, the steps of the method for dynamically estimating the core temperature 220 of at least one cell 110a-110h may be performed in any order such that the core temperature 220 of the cells 110a-110h is estimated as discussed herein. More particularly, the steps of receiving the surface temperature 210, current, voltage, and state of charge of the at least one cell 110a-110h, and the period of time from the initiation of a rest period 240 to the termination 230 of the rest period 240 may be performed in any order such that the internal resistance may be determined based on the surface temperature 210, the current, the time, and the lumped internal resistance 50. Alternatively, the steps of receiving the surface temperature 210, current 80, voltage 60, and state of charge of the at least one cell 110a-110h, and the period of time from the initiation of a rest period 240 to the termination 230 of the rest period 240 may be performed in any order such that the internal resistance 50 may be performed simultaneously or substantially simultaneously such that the internal resistance 50 may be determined based on the surface temperature 210, the current 80, the time, and the lumped internal resistance 50.

System for Dynamically Estimating the Core Temperature 220

Figure 5:
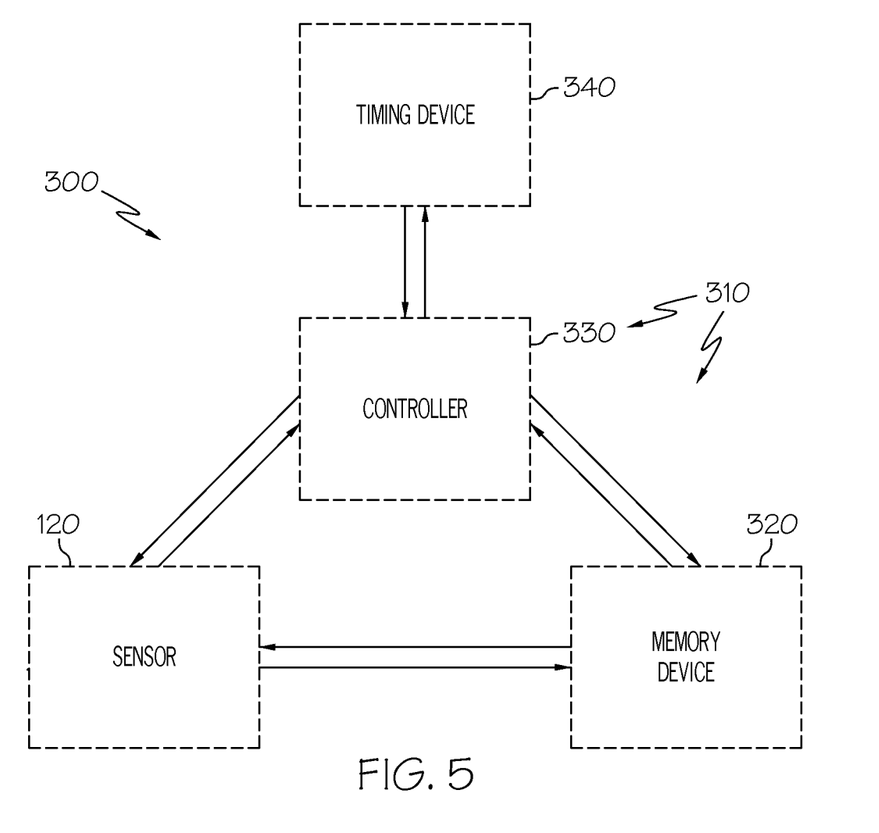
FIG. 5 is a schematic illustration of a system for dynamically estimating the core temperature of at least one cell in a battery during an operative period in accordance with at least one embodiment of the present disclosure.

Referring to FIGS. 2A, 2B, and 5, in another embodiment, a system 300 for dynamically estimating the core temperature 220 of at least one cell 110a-110h in a battery 110 in a vehicle 400 during an operative period and subsequent to a rest period 240, wherein the vehicle 400 receives at least a portion of its power from the battery 110 that is made up of the cells 110a-110h is disclosed. The system 300 includes a plurality of sensors 120 configured to transmit signals related to at least one of the temperature, voltage 60, and current 80 of the battery 110, a timing device 340 configured to transmit signals related to the period of time from the initiation 250 of a rest period 240 to the termination 230 of the rest period 240, and a control system 310 in signal communication with the plurality of sensors 120. The control system 310 includes a memory device 320 and a controller 330 in signal communication with the memory device 320 with instructions for dynamically estimating the core temperature 220 of the at least one cell 110a-110h in a battery 110 during an operative period. The instructions are written to receive the surface temperature 210, current 80, voltage 60, and state of charge of the at least one cell 110a-110h and obtain the period of time from the initiation 250 of the rest period 240 to the termination 230 of the rest period 240, to determine an initial value of the lumped internal resistance 50, to determine subsequent values of the lumped internal resistance 50 recursively in real-time based on the initial value, the current 80, and the voltage 60, and to determine the core temperature 220 of the at least one cell 110a-110h based on the surface temperature 210, the current, the obtained time, and the lumped internal resistance 50. The instructions are written to determine the core temperature 220 as characterized by the relationship set forth in equation (1) above.

The system 300 for dynamically estimating the core temperature 220 of the cells 110a-110h in the battery 110 may be provided in a vehicle 400. The battery 110 and the cells 110a-110h are as discussed in an earlier section. As shown in FIGS. 2A and 2B, the vehicle 400 may be any vehicle wherein the vehicle receives at least a portion of its power from the battery 110. For example, the vehicle 400 may be a hybrid vehicle, an electric vehicle, an electric hybrid vehicle, or a fuel-powered vehicle. In an alternative aspect, the system 300 for dynamically estimating the core temperature 220 of at least one cell 110a-110h may be provided in devices other than a vehicle 400, wherein the device derives at least a portion of its power from the battery 110.

It is understood by one of ordinary skill in the art that the vehicle 400 may include, in addition to battery 110, a hybrid system controller 410, an internal combustion engine 420, a plurality of motion generating means 430, 432, a front and rear wheel set 440, 442, a plurality of DC converters 450, a differential 460, and a plurality of power inverter modules 470. The vehicle 400 may further comprise additional components not discussed herein which would be useful in combination with a hybrid vehicle, an electric vehicle, an electric hybrid vehicle, or a fuel-powered vehicle.

Referring to FIG. 5, the system 300 for dynamically estimating the core temperature 220 of at least one cell 110a-110h during an operative period includes a plurality of sensors 120 configured to transmit signals related to at least one of the temperature, voltage 60, and current 80 of the at least one cell 110a-110h in the battery 110. The sensors 120 are as described in an earlier section. In one particular embodiment, the sensors 120 may be selected from the group consisting of a thermistor, a voltmeter, a potentiometer, an oscilloscope, an ammeter, a clamp meter, or a galvanometer, and combinations thereof. The system 300 also includes a timing device 340. The timing device 340 may include any device capable of measuring and/or determining the time from the initiation 250 of the rest period 240 to the termination 230 of the rest period 240 as discussed in an earlier section. In one embodiment, the timing device 340 is in signal communication (as indicated in FIG. 5 by a double arrowed line) with the controller 330.

The control system 310 is in signal communication (as indicated in FIG. 5 by a double arrowed line) with the sensors 120 and the timing device 340. The control system 310 includes a memory device 320 and a controller 330 in signal communication (also indicated in FIG. 5 by a double arrowed line). The control system 310 includes instructions for estimating the core temperature 220 of at least one cell 110a-110h in the battery 110 at the termination 230 of the rest period 240 in a manner represented by equations (1) to (3) as set forth above.

The memory device 320 may be RAM, DRAM, SDRAM, ROM, a flash memory or a static memory. The controller 330 may be an integrated circuit, a microchip, a computer, an application-specific integrated circuit ("ASIC"), or a field programmable gate array ("FPGA"). In one particular embodiment, the memory device 320 and the controller 330 may be discrete components which are in signal communication with one another. However, it is understood by one skilled in the art that the memory device 320 and the controller 330 may also form an integral unit.

The control system 310 may be integrated within other systems of the vehicle 400. For example, the control system 310 may be in signal communication with other systems of the vehicle 400 such that it may convey information related to the dynamically estimated core temperature 220 to the systems, which allows such systems to operate the vehicle 400 to maximize performance, efficiency, longevity, and other optimizable parameters. More particularly, conveying information related to the determined core temperature 220 to various systems in the vehicle 400 may offer the following advantages, including, but not limited to: (1) improving battery availability to improve fuel economy and performance in a vehicle; (2) enhancing power capability estimation; (3) preventing stall conditions in a vehicle; (4) increasing availability of auto stop/start function in a vehicle; (5) improving warranties as transition to various battery wearout failure modes is closely linked to the core temperature of the cells as opposed to the surface temperature of the cells; (6) providing flexible placement of the sensors allowing for a cost-effective and robust hardware solution; (7) separating temperature sensors from high voltage or vented battery material; (8) functionally decoupling the temperature sensors from the battery module design; (9) providing a battery management control system independent from the battery cooling system as no cooling air temperature, fan speed, or air flow rate are required, which keeps the HVAC system from OBD-II compliance (i.e. On-Board Diagnostics) and decouples the battery temperature sensing from the thermal system; and (10) adapting as the battery ages and changes internal resistance characteristics.

The instructions are written to receive the surface temperature, current 80, and voltage 60 of the at least one cell 110a-110h. The surface temperature 210, current 80, and voltage 60 may be measured and/or determined during an operative period with sensors 120 as discussed in an earlier section. In one embodiment, the surface temperature 210, current 80, and voltage 60 are stored on a memory device 320, such that the controller 330 may obtain the surface temperature 210, current 80, and voltage 60 from the memory device 320 on which it is stored.

The instructions are also written to receive the state of charge of the at least one cell 110a-110h. The state of charge may be determined and/or estimated as discussed in an earlier section. The state of charge may be stored on a memory device 320, such that the controller 330 obtains the state of charge therefrom. The instructions are also written to obtain the period of time from the initiation 250 of a rest period 240 to the termination 230 of the rest period 240 as discussed in an earlier section. In one embodiment, the time from the initiation 250 of the rest period 240 to the termination 230 of the rest period 240 is stored on a memory device 320, such that the controller 330 obtains the period of time from the initiation 250 of the rest period 240 to the termination 230 of the rest period 240 from the memory device 320 on which it is stored.

The instructions are also written to determine an initial value of the lumped internal resistance 50, to determine subsequent values of the lumped internal resistance 50 recursively in real-time based on the initial value, the current 80, and the voltage 60, and to determine the core temperature 220 of the at least one cell 110a-110h based on the surface temperature 210, the current 80, the obtained time, and the lumped internal resistance 50 as discussed in an earlier section. The initial value is determined at the termination 230 of the rest period 240 based on the surface temperature 210 and the state of charge. The lumped internal resistance 50 is determined recursively in real-time via a least squares relationship. For example, the instructions are written to estimate the internal resistance 50 in accordance with equations (4)-(8) set forth above. The initial value and subsequent values of the lumped internal resistance 50 may be stored on a memory device 320.

The instructions are written to determine the core temperature 220 independent of at least one cooling air temperature, cooling air flow rate, and fan speed of the battery. The instructions are also written to limit the surface temperature 210 to a predetermined value range as discussed in an earlier section. For example, the instructions may be further written to limit the lumped internal resistance 50 in accordance with the relationships expressed in equation (9). The instructions may also be further written to store temperature information in the memory device 320 at the initiation 250 of the rest period 240 wherein at least one cell 110a-110h faults as discussed in an earlier section.

Additionally, the instructions are also written to filter at least one of the surface temperature 210, the voltage 60, and the current 80 via a low-pass filter method. The instructions are also written to filter the surface temperature 210 via a moving average method as discussed in an earlier section.

In another embodiment, the instructions are written to obtain the determined core temperature 220 from a previous estimation as discussed in an earlier section. For example, the previously determined core temperature 220 may be stored in the memory device 320. The previously determined core temperature 220 may be estimated subsequent to termination 230 of the rest period 240 or at the termination 230 of the rest period 240 as previously discussed in an earlier section. The instructions may also be further written to update the determined core temperature 220 at a periodic time interval as discussed in an earlier section.

The above description and drawings are only to be considered illustrative of exemplary embodiments, which achieve the features and advantages of the present disclosure. Modification and substitutions the features and steps described can be made without departing from the intent and scope of the present disclosure. Accordingly, the disclosure is not to be considered as being limited by the foregoing description and drawings, but is only limited by the scope of the appended claims.

What is claimed is:

1. A method for dynamically estimating the core temperature of at least one cell in a battery during an operative period, the method comprising:
receiving by at least one controller the surface temperature of the at least one cell, the current of the at least one cell, the voltage of the at least one cell, the state of charge of the at least one cell, and the period of time from the initiation of a rest period to the termination of the rest period;
determining an initial value of the lumped internal resistance of the at least one cell based on the surface temperature and the state of charge;
determining subsequent values of the lumped internal resistance recursively in real-time based on the initial value of the lumped internal resistance, the current, and the voltage; and
determining the core temperature of the at least one cell based on the surface temperature, the current, the period of time from the initiation of the rest period to the termination of the rest period, the initial value of the lumped internal resistance, and the subsequent values of the lumped internal resistance.

2. The method of claim 1, wherein the core temperature is determined independent of at least one of cooling air temperature, cooling air flow rate, and fan speed of the battery.

3. The method of claim 1, wherein the subsequent values of the lumped internal resistance are determined recursively in real-time via a least squares relationship.

4. The method of claim 1, wherein the initial value of the lumped internal resistance is determined at the termination of the rest period.

5. The method of claim 1, further comprising limiting the surface temperature to a predetermined value range.

6. The method of claim 1, further comprising filtering at least one of the surface temperature, the voltage, and the current via a low-pass filter method.

7. The method of claim 1, further comprising filtering the surface temperature via a moving average method.

8. The method of claim 1, further comprising storing temperature information of the at least one cell wherein one or more of the at least one cell faults.

9. The method of claim 1, wherein the determined core temperature of the at least one cell is characterized by the following relationship:

$$T_{est}(k+1) = \frac{\tau - \Delta T}{\tau} T_{est}(k) + \frac{\Delta T}{\tau} T_{sur}(k) + \frac{\Delta T}{\tau} \alpha R_{int} I^2(k)$$

wherein $\tau$ is a thermal dynamic time constant, $\alpha$ is a heat transfer constant, $T_{est}$ is the estimated core temperature of the at least one cell, $T_{sur}$ is surface temperature of the at least one cell, $\Delta T$ is the time period from a previous estimation of the core temperature of the at least one cell to the current estimation of the core temperature of the at least one cell, $R_{int}$ is the lumped internal resistance of the at least one cell, and $I$ is the current of the at least one cell.

10. The method of claim 1, further comprising updating the determined core temperature at a periodic time interval.

11. The method of claim 10, wherein the periodic time interval comprises about 25 ms.

12. A system for dynamically estimating the core temperature of at least one cell in a battery in a vehicle during an operative period, wherein the vehicle receives at least a portion of its power from the battery, the system comprising:
a plurality of sensors configured to transmit signals related to at least one of surface temperature, current, and voltage of the battery;
a timing device configured to transmit signals related to the period of time from the initiation of a rest period to the termination of the rest period;
a control system in signal communication with the plurality of sensors and the timing device, wherein the control system comprises a memory device and a controller in signal communication with the memory device with instructions for dynamically estimating the core temperature of at least one cell in a battery during an operative period and subsequent to a rest period, the instructions being written to:

receive the surface temperature of the at least one cell, the current of the at least one cell, the voltage of the at least one cell, the state of charge of the at least one cell, the period of time from the initiation of the rest period to the termination of the rest period;

determine an initial value of the lumped internal resistance of the at least one cell based on the surface temperature of the at least one cell and the state of charge of the at least one cell; and determine subsequent values of the lumped internal resistance recursively in real-time based on the initial value of the lumped internal resistance of the at least one cell, the current of the at least one cell, and the voltage of the at least one cell; and determine the core temperature of the at least one cell based on the surface temperature of the at least one cell, the current of the at least one cell, the period of time from the initiation of the rest period to the termination of the rest period, the initial value of the lumped internal resistance, and the subsequent values of the lumped internal resistance.

13. The system of claim 12, wherein the core temperature is determined independent of at least one of cooling air temperature, cooling air flow rate, and fan speed of the battery.

14. The system of claim 12, wherein the initial value is determined at the termination of the rest period.

15. The system of claim 12, wherein the instructions are further written to limit at least one of the surface temperature of the at least one cell and the estimated lumped internal resistance.

16. The system of claim 12, wherein the instructions are further written to filter at least one of the surface temperature of the at least one cell, the voltage of the at least one cell, and the current of the at least one cell.

17. The system of claim 12, wherein the instructions are written to update the determined core temperature at a periodic time interval.

18. The system of claim 12, wherein the instructions are further written to store temperature information of the at least one cell wherein one or more of the at least one cell faults.

19. The system of claim 12, wherein the instructions are written to determine the core temperature of the at least one cell in accordance with the following relationship:

$$T_{est}(k+1) = \frac{\tau - \Delta T}{\tau} T_{est}(k) + \frac{\Delta T}{\tau} T_{sur}(k) + \frac{\Delta T}{\tau} \alpha R_{int} I^2(k)$$

wherein $\tau$ is a thermal dynamic time constant, $\alpha$ is a heat transfer constant, $T_{est}$ is the estimated core temperature of the at least one cell, $T_{sur}$ is surface temperature of the at least one cell, $\Delta T$ the time period from a previous estimation of the core temperature of the at least one cell to the current estimation of the core temperature of the at least one cell, $R_{int}$ is the lumped internal resistance of the at least one cell, and I is the current of the at least one cell.

20. A vehicle incorporating the system of claim 12.

* * * * *